United States Patent [19]
Alt

[11] 3,926,613
[45] Dec. 16, 1975

[54] 1-(NAPHTHYL AND NAPHTHYLOXY-ACETYL-2,2-DIALKYL HYDRAZINE ACIDS AND THEIR USE AS HERBICIDES

[75] Inventor: Gerhard H. Alt, Creve Coeur, Mo.

[73] Assignee: Monsanto Company, St. Louis, Mo.

[22] Filed: July 2, 1973

[21] Appl. No.: 375,397

Related U.S. Application Data

[62] Division of Ser. No. 214,382, Dec. 30, 1971, Pat. No. 3,767,623.

[52] U.S. Cl. .................................. 71/118; 71/76
[51] Int. Cl.² .......................................... A01N 9/20
[58] Field of Search .................................. 71/118

[56] References Cited
UNITED STATES PATENTS

| | | | |
|---|---|---|---|
| 2,341,868 | 2/1944 | Hitchcock et al. | 71/118 |
| 2,472,347 | 6/1949 | Sexton | 71/118 |
| 3,439,018 | 4/1969 | Brookes et al. | 71/118 |
| 3,481,730 | 12/1969 | Douros, Jr. et al. | 71/118 |
| 3,718,455 | 2/1973 | Baker | 71/118 |

FOREIGN PATENTS OR APPLICATIONS

| | | | |
|---|---|---|---|
| 4,431 | 2/1969 | Japan | 71/118 |
| 521,807 | 2/1956 | Canada | 71/118 |

OTHER PUBLICATIONS

Buu–Hoi et al., "Mechanism of Action of Tuberculostatic Hydrazides," (1952), CA 47, p. 2358 (1953).
Weinswig et al., "Monoamine Oxidase Inhibitors, etc.," (1965), CA 63, p. 13171 (1965).
Liberman et al., "New Isopropylhydrazide Monoamine etc.," (1961), CA 56, pp. 11416–11417 (1962).
Buu–Hoi et al II, "Tuberculostatic Hydrazides and Thickeners," (1953), CA 48, pp. 7580–7581, (1954).
Kraus et al., "Growth-regulating Substances as Herbicides," (1947), CA 41, p. 3902, (1947).
Brian, "Synthesis of ders. of N,N-dimethylhydrazine etc,." (1971), J. Med. Chem. (1971), pp. 1133–1134.

*Primary Examiner*—Glennon H. Hollrah
*Attorney, Agent, or Firm*—William T. Black

[57] ABSTRACT

The 1-(naphthyl and naphthyloxy)-acetyl-2,2-dialkyl hydrazine acids have been found to be active pre-emergent herbicides. These compounds are especially active against Canadian thistle and field bindweed.

6 Claims, No Drawings

1-(NAPHTHYL AND NAPHTHYLOXY-ACETYL-2,2-DIALKYL HYDRAZINE ACIDS AND THEIR USE AS HERBICIDES

This is a division of application Ser. No. 214,382, filed Dec. 30, 1971, now U.S. Pat. No. 3,767,623.

This invention relates to novel 1-(2-substituted)acetyl-2,2-dialkyl hydrazines. More particularly, this invention relates to the 2-naphthyl and 2-naphthyloxy substituted acetyl dialkyl hydrazines. These new compounds have been found to be useful as pre-emergent herbicides.

In accordance with this invention, it has been discovered that novel hydrazines of the formula

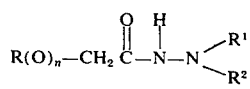

wherein R is a naphthyl group, $R^1$ and $R^2$ are each lower alkyl groups containing from 1 to 6 carbon atoms and n is an integer of 0 or 1; possess herbicidal activity.

A preferred embodiment of this invention are those compounds of the above formula in which $R^1$ and $R^2$ are alkyl groups having a maximum of 3 carbon atoms.

The naphthyl groups represented by R include both the 1-substituted naphthyl group and the 2-substituted naphthyl groups, that is α and β-naphthyl groups. Illustrative of the alkyl groups represented by $R^1$ and $R^2$ are, for example, methyl, ethyl, propyl, isopropyl, butyl, secondary butyl, tertiary butyl, pentyl, hexyl and its isomers.

In general, the compounds of this invention are prepared by the reaction of 1,1-dialkyl hydrazine with the appropriate acid chloride in a benzene solution. In general, acid chloride is added slowly, with stirring, and cooling by means of an ice bath to a solution of the hydrazine in an organic solvent which is non-reactive towards either the hydrazine or the acid chloride. The reaction mixture is then allowed to warm to room temperature with continuous stirring and water added to precipitate the solid product. The solid product can be recrystallized in an organic solvent medium such as ethyl acetate-petroleum ether mixtures to yield a pure product.

The temperature at which the reaction is conducted is not narrowly critical and can range from as low as −10° to 30°C or even higher, depending upon the solvent employed and the speed of addition of the reactants.

For convenience, one can employ two moles of the hydrazine for each mole of the acid chloride, the molar excess of hydrazine being employed to accept the liberated hydrogen chloride. Equimolar amounts of the reactants can be employed if an acid acceptor such as pyradine, triethylamine or sodium carbonate is employed.

Among the organic solvents which can be employed in producing the compounds of this invention are the aprotic solvents such as benzene and the like which are non-reactive towards the dimethyl hydrazine or the acid chloride.

The starting naphthoxy or naphthyl substituted acetic acid halides are commercially available or are prepared by methods well known in the art.

The following examples serve to further illustrate this invention. All parts are by weight unless otherwise expressly set forth.

EXAMPLE 1

To a solution of 1,1-dimethyl hydrazine (0.3 mols) in benzene (90 milliliters) was added dropwise with stirring and cooling in an ice bath, a solution of 2-(2-naphthyloxy)-acetyl chloride (0.15 mols) in benzene (90 mls.). The reaction mixture was allowed to come to room temperature and stirred for 18 hours. Approximately 300 mls. of water was added to the reaction mixture and the solid material which precipitated out was removed by filtration. The material was recrystalized from ethyl acetate-petroleum ether mixture and had a melting point of 107° to 109°C. This solid material was identified as 1-(2-naphthyloxyacetyl)-2,2-dimethyl hydrazine and gave the following analysis:

Calc'd: C, 68.83; H, 6.6; N, 11.47. Found: C, 68.73; H, 6.67; N, 11.35.

EXAMPLE 2

The procedure of Example 1 was followed, however, 2-(1-naphthyl)-acetyl chloride was substituted for the acid chloride employed in Example 1 to give 1-(1-naphthylacetyl)-2,2-dimethyl hydrazine having a melting point of 137° to 139°C. The compound gave the following analysis:

Calc'd: C, 73.66; H, 7.06; N, 12.27. Found: C, 73.70; H, 7.18; N, 12.14.

Following the procedure of Examples 1 and 2, the following compounds can be prepared:

1-(2-naphthyloxyacetyl)-2,2-diethyl hydrazine
1-(2-naphthyloxyacetyl)-2,2-dipropyl hydrazine
1-(2-naphthyloxyacetyl)-2,2-dibutyl hydrazine
1-(2-naphthyloxyacetyl)-2,2-dihexyl hydrazine
1-(1-naphthyloxyacetyl)-2,2-dimethyl hydrazine
1-(1-naphthyloxyacetyl)-2,2-diethyl hydrazine
1-(1-naphthyloxyacetyl)-2,2-dipentyl hydrazine
1-(1-naphthylacetyl)-2,2-diethyl hydrazine
1-(1-naphthylacetyl)-2,2-dipropyl hydrazine
1-(1-naphthylacetyl)-2,2-dibutyl hydrazine
1-(1-naphthylacetyl)-2,2-dihexyl hydrazine
1-(2-naphthylacetyl)-2,2-dimethyl hydrazine
1-(2-naphthylacetyl)-2,2-diethyl hydrazine
1-(2-naphthylacetyl)-2,2-dibutyl hydrazine
1-(2-naphthylacetyl)-2,2-dihexyl hydrazine The compounds of the present invention possess herbicidal activity. This herbicidal activity is illustrated by the following examples.

EXAMPLE 3

This example illustrates pre-emergent activity of the compounds of this invention.

A good grade of top soil is placed in aluminum pans and compacted to a depth of ⅜ to ½ inch from the top of each pan. A pre-determined number of seeds and vegetative propagules of each of several plant species are placed on top of the soil in the pans. The seeds and propagules are covered with a measured amount of soil containing the chemical admixed throughout. The herbicidal composition is applied at a rate of 5 pounds per acre by spraying the soil to be used as a cover layer, then thoroughly mixing the soil and herbicidal compound. The pans are placed on the sand of a greenhouse bench and watered as needed. The soil in the pans absorbs moisture through the apertured bottom of the pans. The plants are observed at the end of approximately 14 days and the results recorded.

The pre-emergent herbicidal activity of the compounds of this invention is measured by the average percent control of each of the plant species. The average percent control is converted to a relative numerical scale for the sake of brevity and simplicity in the example. The pre-emergent herbicidal activity index used in the Table is defined as follows:

| Average Percent Control | Numerical Scale |
|---|---|
| 0 – 25 | 0 |
| 26 – 50 | 1 |
| 51 – 75 | 2 |
| 76 – 100 | 3 |

The pre-emergent herbicidal activity of some of the compounds of the present invention is recorded in the following Table.

TABLE I

| Plant Specie | Compound of Examples 2 | 1 |
|---|---|---|
| Canada Thistle | 3 | 3 |
| Nutsedge | 1 | 0 |
| Quackgrass | 3 | 0 |
| Johnson Grass | 2 | 0 |
| Cocklebur | 0 | 3 |
| Velvet Leaf | 3 | 2 |
| Morning Glory | 3 | 3 |
| Lambsquarter | 3 | 3 |
| Smartweed | — | — |
| Downy Brome | 1 | 0 |
| Barnyard Grass | 1 | 0 |

In a second test at the same rate and following the above procedure but employing different plant species, the pre-emergent results are shown in Table II.

TABLE II

| Plant Specie | Compound of Examples 2 | 1 |
|---|---|---|
| Soybean | 3 | 3 |
| Sugar Beet | 3 | 2 |
| Wheat | 1 | 0 |
| Rice | 3 | 1 |
| Sorghum | 2 | 0 |
| Cocklebur | 1 | 0 |
| Wild Buckwheat | 3 | 0 |
| Morning Glory | 3 | 2 |
| Hemp Sesbania | 2 | 1 |
| Lambsquarter | 3 | 3 |
| Smartweed | 2 | 2 |
| Velvet Leaf | 2 | 3 |
| Downy Brome | 1 | 0 |
| Panicum spp | 2 | 0 |
| Barnyard Grass | 2 | 1 |
| Crabgrass | 2 | 1 |

EXAMPLE 4

In a post-emergent herbicidal test, the active ingredients in each case is applied in spray form to 21 day old specimens of the plants (species indicated hereinafter). The herbicidal sprays are acetone-water solutions containing surface active agent and varying amounts of the active ingredient. The solution are applied to the plants in different pans at rates equal to 4 pounds of active ingredient per acre. The treated plants are placed in a greenhouse and the effects are observed and recorded after approximately 14 days.

The post-emergent herbicidal activity index used in this example is defined as follows:

| Numerical Scale | Herbicidal Activity |
|---|---|
| 0 | No phytotoxicity |
| 1 | Slight phytotoxicity |
| 2 | Moderate phytotoxicity |
| 3 | Severe phytotoxicity |
| 4 | Plants dead |

The results of the post-emergent tests are given in Table III.

TABLE III

| Plant Specie | Compound of Examples 2 | 1 |
|---|---|---|
| Canada Thistle | — | 2 |
| Nutsedge | 0 | 0 |
| Quackgrass | 0 | 0 |
| Johnson Grass | 0 | 0 |
| Cocklebur | 1 | — |
| Velvet Leaf | 0 | 2 |
| Morning Glory | 1 | 3 |
| Lambsquarter | 1 | 3 |
| Smartweed | — | 1 |
| Downy Brome | 1 | 0 |
| Barnyard Grass | 0 | 0 |

For the sake of brevity and simplicity, the term "active ingredient" is used in this specification to describe the naphthyl and naphthyloxy acetyl hydrazines of this invention.

The term "herbicide" as used herein and in the appended claims means materials which control the growth of plants either (1) all plants in a given locus or (2) selectively control the growth of one or more plant species in the presence of other plants. In like manner, "herbicidal" is used to identify the overall and selective control activity of the compositions of this invention.

The term "plant" as used herein and in the appended claims is inclusive of dormant seeds, germinant seeds, germinative seeds, emerging seedlings and established woody and herbaceous vegetation including the roots and above-ground portions.

The term "control" as used herein and in the appended claims is inclusive of the actions of (1) killing, (2) inhibiting growth, reproduction or proliferation, and (3) removing, destroying or otherwise diminishing the occurrence and activity of plants and is applicable to any of the stated actions, or any combination thereof.

The term "herbicidal formulation or composition" as used herein means a naphthyl or naphthyloxy acetyl hydrazine of this invention in combination with an adjuvant to be defined hereinbelow.

The active ingredients hereindefined are suitable for both pre-emergent and post-emergent plant application. That is, they are effective in controlling the growth of germinant seeds, emerging seedlings and established vegetation by exposing the seeds, emerging seedlings, or the roots or above-ground portions to the action of an effective amount of one or more of these herbicidally active compounds; however, the best results are usually obtained in a pre-emergent application. Such constitutes a preferred embodiment of the method of controlling plants.

In foliar treatment for the modification of vegetative growth, the active ingredients are applied in amounts from about 0.1 to about 50 or more pounds per acre, preferably about 0.1 to 15 pounds per acre in foliar treatments. In soil applications, it is desirable that the active ingredients be distributed to a depth of at least 0.2 inches. In pre-emergence herbicidal applications the active ingredients are usually applied in amounts from about 0.1 to 25 pounds per acre but preferably from about 0.1 to 10 pounds per acre. It is believed that one skilled in the art can readily determine from the teachings of this specification, including examples, the procedure for any particularly desired application.

In practicing the herbicidal methods of this invention, the active ingredients can be used alone or in combination with a material referred to in the art as an adjuvant in liquid or solid form. The usual purpose of adjuvants are to facilitate application of the herbicidal composition and at the desired dosage rate. Herbicidal formulations are prepared by admixing the active ingredient with one or more adjuvants which includes diluents, extenders, carriers and conditioning agents to provide compositions in the form of finely-divided particulate solids, granules, pellets, solutions, dispersions or emulsions. Thus, the active ingredient can be used with an adjuvant such as a finely-divided particulate solid, a liquid of organic origin, water, a wetting agent, dispersing agent, an emulsifying agent or any suitable combination of these.

Suitable adjuvants of the foregoing types are not here defined in detail as to composition, particle size, relative amounts, etc., since they are well known in the art.

In general, the active ingredients may be formulated with the active ingredient in minor or major proportions in accordance with the table below:

| Type of Formulation | Concentration of Active Ingredient |
| --- | --- |
| 1. Granules of relatively large particle size | 5 to 50% |
| 2. Powdery dusts | 2 to 90% |
| 3. Wettable powders | 2 to 90% |
| 4. Emulsifiable concentrates | 5 to 95% |
| 5. Solutions | .01 to 95% |
| 6. One of the less common types of formulations depending on the desired mode of application | .01 to 95% |

In addition to adjuvants the compounds of this invention can be used in combination with fertilizers and/or other pesticides such as insecticides, fungicides, nematocides, and/or other phytotoxicants, and the like.

Having now described the invention, many ramifications and modified embodiments will readily occur to those skilled in the art. Insofar as such variations do not depart from the spirit and scope of the invention described in this application, they are intended to be embraced by the appended claims in their broadest construction. What is claimed is:

1. Herbicidal composition comprising an inert carrier and a herbicidally effective amount of a compound of the formula

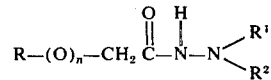

wherein R is a naphthyl group, $R^1$ and $R^2$ are each independently an alkyl group of from 1 to 6 carbon atoms and $n$ is 0 or 1.

2. Composition of claim 1 wherein the compound is 1-(1-naphthylacetyl)-2,2-dimethyl hydrazine.

3. Composition of claim 1 wherein the compound is 1-(2-naphthyloxy acetyl)-2,2-dimethyl hydrazine.

4. A herbicidal method which comprises applying to plants or the plant locus a herbicidally effective amount of a compound of the formula

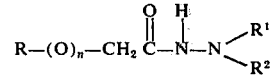

wherein R is a naphthyl group, $R^1$ and $R^2$ are each independently an alkyl group of from 1 to 6 carbon atoms and $n$ is 0 or 1.

5. A method of claim 4 wherein the compound is 1-(1-naphthylacetyl)-2,2-dimethyl hydrazine.

6. A method of claim 4 wherein the compound is 1-(2-naphthyloxy acetyl)-2,2-dimethyl hydrazine.

* * * * *